(12) United States Patent
Zhu et al.

(10) Patent No.: US 8,079,001 B2
(45) Date of Patent: Dec. 13, 2011

(54) VERIFICATION OF REQUIREMENTS SPECIFICATION, DESIGN SPECIFICATION, AND COMPUTER-READABLE STORAGE MEDIUM APPARATUS, AND METHOD THEREOF

(75) Inventors: Qiang Zhu, Yamato (JP); Hiroaki Iwashita, Kawasaki (JP); Koichiro Takayama, Kawasaki (JP); Tsuneo Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 384 days.

(21) Appl. No.: 12/136,378

(22) Filed: Jun. 10, 2008

(65) Prior Publication Data
US 2008/0312890 A1    Dec. 18, 2008

(30) Foreign Application Priority Data

Jun. 15, 2007 (JP) ................... 2007-159004

(51) Int. Cl.
*G06F 17/50* (2006.01)
*G06F 9/455* (2006.01)
(52) U.S. Cl. .................................... 716/106
(58) Field of Classification Search ............ 716/5, 106
See application file for complete search history.

(56) References Cited

U.S. PATENT DOCUMENTS

| | | | | |
|---|---|---|---|---|
| 5,517,432 A | * | 5/1996 | Chandra et al. | 703/14 |
| 6,141,630 A | * | 10/2000 | McNamara et al. | 703/14 |
| 6,427,223 B1 | * | 7/2002 | Kim et al. | 716/4 |
| 6,751,582 B1 | * | 6/2004 | Andersen et al. | 703/14 |
| 6,874,135 B2 | * | 3/2005 | Gupta et al. | 716/4 |
| 7,454,324 B1 | * | 11/2008 | Seawright et al. | 703/14 |
| 7,512,913 B2 | * | 3/2009 | Matsuura | 716/4 |
| 7,702,498 B2 | * | 4/2010 | Agarwala | 703/23 |
| 7,797,648 B1 | * | 9/2010 | Huang | 716/4 |
| 2004/0230928 A1 | * | 11/2004 | Nozuyama | 716/5 |
| 2005/0125754 A1 | * | 6/2005 | Schubert et al. | 716/5 |
| 2007/0150845 A1 | * | 6/2007 | Matsuura | 716/4 |

FOREIGN PATENT DOCUMENTS

| JP | 03-099228 | 4/1991 |
|---|---|---|
| JP | 2001-014365 | 1/2001 |

OTHER PUBLICATIONS

Yatin Hoskote, et al. "Coverage Estimation for Symbolic Model Checking", in Proc. of ACM/IEEE DAC, 1999, pp. 300-305.
Xingwen Xu, et al., "Transition-Based Coverage Estimation for Symbolic Model Checking," 0-7803-9451-8/06 IEEE, 2006, pp. 1-6.

\* cited by examiner

*Primary Examiner* — Stacy Whitmore
(74) *Attorney, Agent, or Firm* — Staas & Halsey LLP

(57) ABSTRACT

Conditions necessary to be satisfied for execution of each use case from a use case description indicative of a requirements specification of the design object are acquired. Then a state satisfying the conditions, from among a set of states represented in a finite state machine model indicative of a design specification of the design object are detected. A presence or absence of an undetected state in the set of states in accordance with the detection is determined and output.

20 Claims, 14 Drawing Sheets

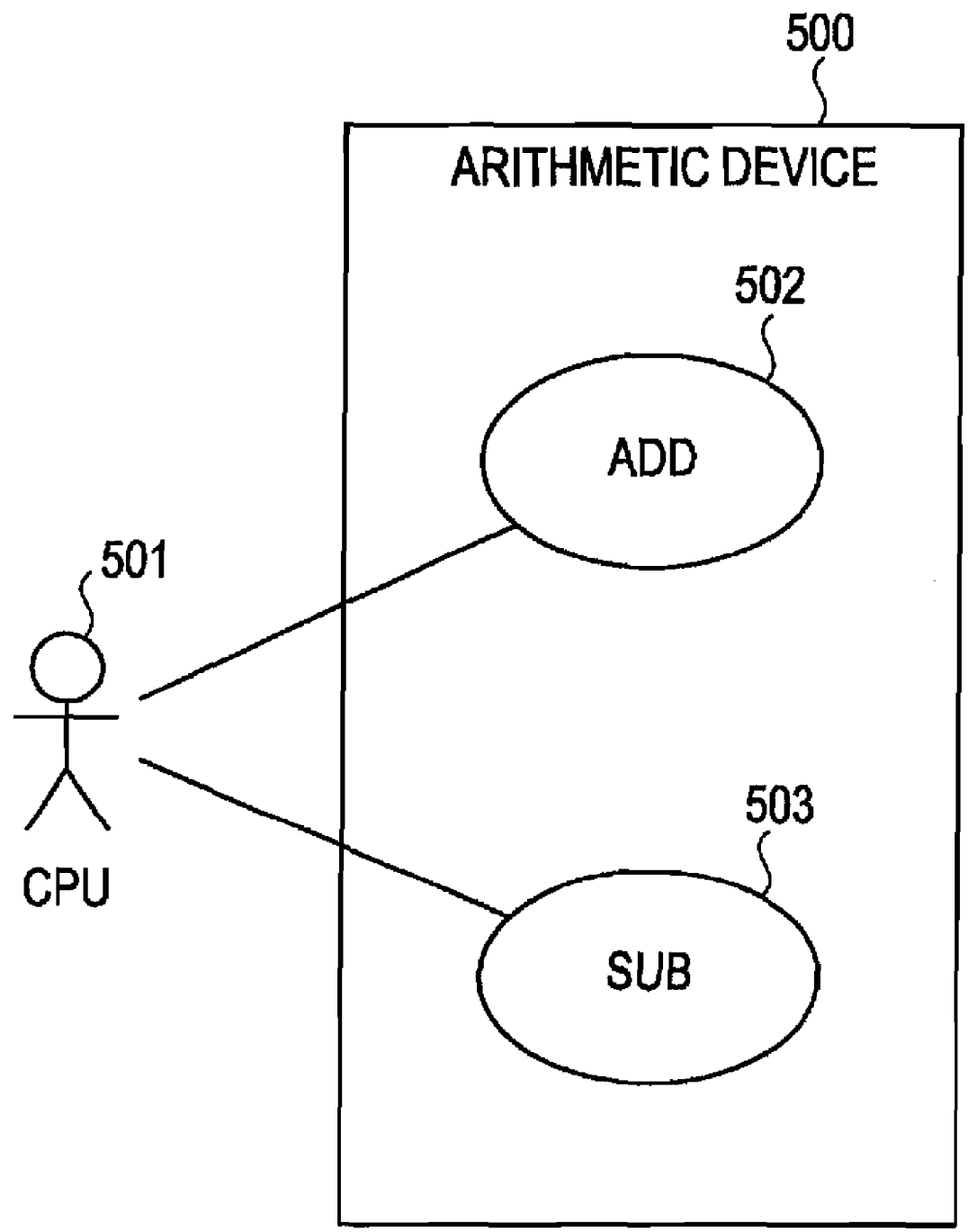

FIG. 6

| USE CASE NAME | ADD |
|---|---|
| ANTERIOR CONDITION | RESET CANCELLATION & ADDITION MODE |
| POSTERIOR CONDITION | ADDITION COMPLETION STATE |
| INVARIANT CONDITION | MAINTAINED IN RESET CANCELLATION |

610

| USE CASE NAME | SUB |
|---|---|
| ANTERIOR CONDITION | RESET CANCELLATION & SUBTRACTION MODE |
| POSTERIOR CONDITION | SUBTRACTION COMPLETION STATE |
| INVARIANT CONDITION | MAINTAINED IN RESET CANCELLATION |

620

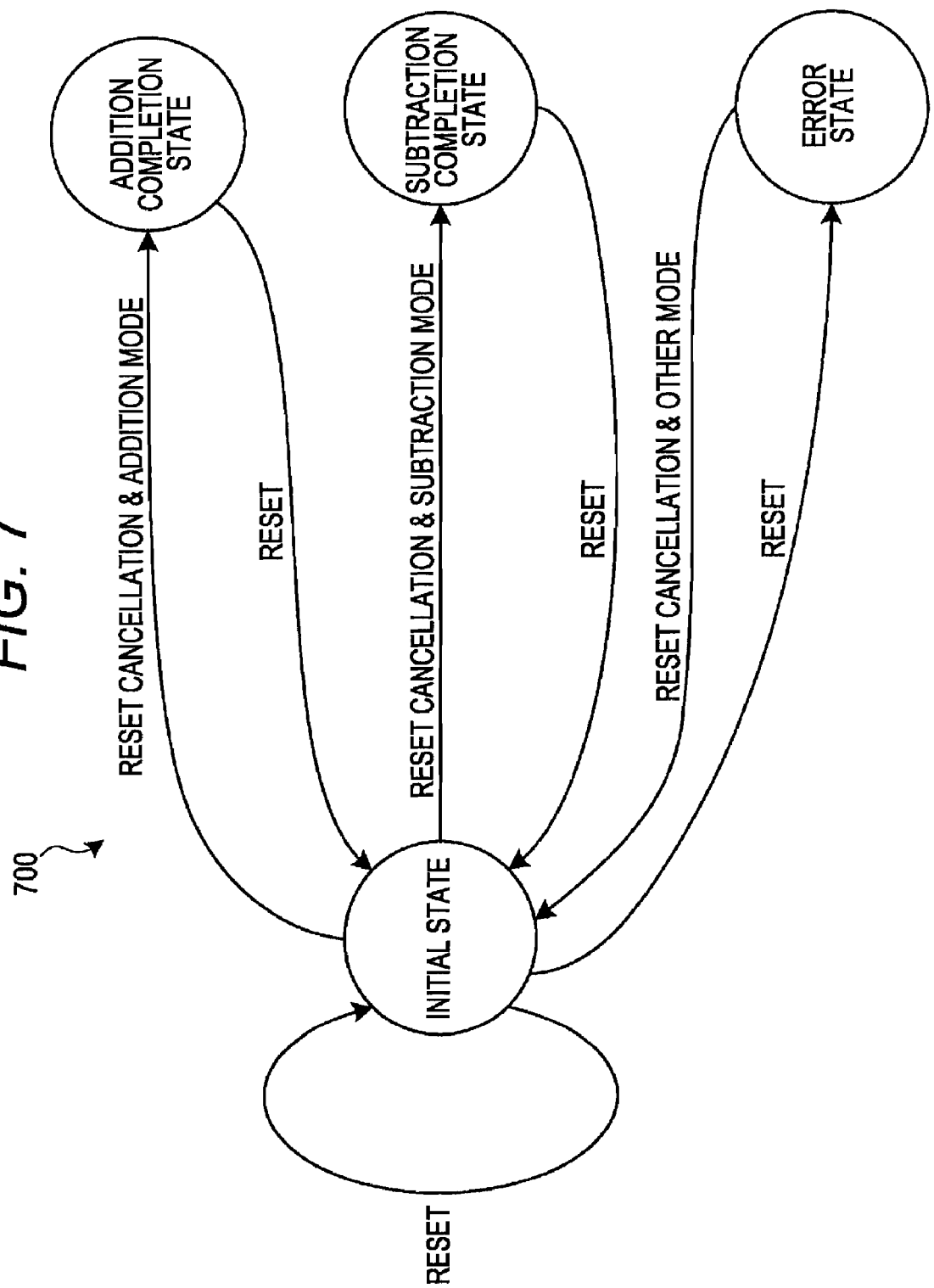

VERIFICATION OF REQUIREMENTS SPECIFICATION, DESIGN SPECIFICATION, AND COMPUTER-READABLE STORAGE MEDIUM APPARATUS, AND METHOD THEREOF

CROSS-REFERENCE TO RELATED APPLICATIONS

This application is based upon and claims the benefit of priority from the prior Japanese Patent Application No. 2007-159004 filed on Jun. 15, 2007, the entire contents of which are incorporated herein by reference.

BACKGROUND

1. Field

The embodiments of the present invention relate to a specification verification program that verifies coverage of a requirements specification of a design object, such as a software or hardware product, against a design specification of the design object. The invention further relates to a computer-readable storage medium storing therein the specification verification program, a specification verification apparatus, and a specification verification method.

2. Description of the Related Art

At present, with increase and advances of software and hardware in regard to scale and multi-functionality, the verification task for providing the system quality assurance encounters increasing difficulty. Generally, two tasks are known to be necessary for providing the system quality assurance. One of the tasks is an assurance of correctness in design, and the other is an assurance of correctness in implementation.

Present-day verification/testing techniques are developed focusing attention on, in general, the latter "assurance of correctness in implementation". As examples, there are provided techniques of the type that evaluates the degree of coverage of a test case, which is verified regarding whether a design object operates in conformity with a corresponding specification, thereby executing a comprehensive logic verification (see Japanese Patent Application Laid-Open (JP-A) No. 03-99228 and 2001-14365, for example).

Further, there are provided methods of the type that extracts verification properties of a design object on the basis of the implementation level, and evaluates the degree of coverage of the verification properties against a design specification of the design object, thereby to execute the comprehensive logic verification (see Y. Hoskote, T. Kam, P. H. Ho, and X. Zao, "Coverage Estimation for Symbolic Model Checking," in Proc. of ACM/IEEE DAC, 1999, pp. 300-305; and X. Xu, S. Kimura, K. Horikawa, and T. Tsuchiya, "Transition-based coverage estimation for symbolic model checking," in Proc. of ACM/IEEE, for example).

However, according to conventional techniques, such as described in JP-A-03-99228 and JP-A-2001-14365, no specific consideration is taken into "assurance of correctness in design", which is one of the generally known tasks for providing the system quality assurance. In many cases, the specification is described in a natural language, and hence the assurance of correctness in design is checked in the manner of review of the design, that is, visual checking of the design.

As such, obscurity, inconsistency, omission (missing), and error of the specifications cannot be completely eliminated, so that many cases result in incorrect or fault designs. This causes frequent rectification operations due to fault verification processes, resulting in an increase in the work time of the verification process and hence in an increase in the work time of the design process.

According to the conventional techniques described in JP-A-03-99228 and JP-A-2001-14365, specification requirements are extracted as verification properties, and the degree of coverage with respect to respective outputs is evaluated. As such, it is necessary to perform a process of defining verification properties and observation signals. This requires, for example, much time and labor, resulting in an increase in the work time of the verification process and hence an increase in the work time of the design process.

SUMMARY

According to an embodiment of the present invention, there is provided a storage medium storing a specification verification program that causes a computer to perform a specification verification of coverage of a requirements specification of a design object against a design specification of the design object according to operations of acquiring conditions necessary to be satisfied for execution of each use case from a use case description indicative of the requirements specification of the design object; detecting of a state satisfying the conditions acquired in the acquiring, from among a set of states represented in a finite state machine model indicative of the design specification of the design object; determining presence or absence of an undetected state in the set of states in accordance with a result of the detection performed in the detecting; and outputting a result of the determination.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a use case diagram of an arithmetic device;

FIG. 6 is an explanatory view showing a use case description of the arithmetic device;

FIG. 7 is an explanatory view (Part 1) showing a state transition graph of the arithmetic device;

DETAILED DESCRIPTION OF THE PREFERRED EMBODIMENTS

One embodiment of the present invention will be described herebelow. In the embodiment, a computer-readable recording medium storing a specification verification program, a specification verification apparatus, and a specification verification method are disclosed. According to the specification verification program, efficient and comprehensive logic verification is realized in the manner that the conformability of a requirements specification to a design specification is checked in a stage before implementation. Thereby, a reduction in operational burden on a designer and a reduction in a design period of time can be accomplished.

(Outline of Specification Verification)

Figure 1:
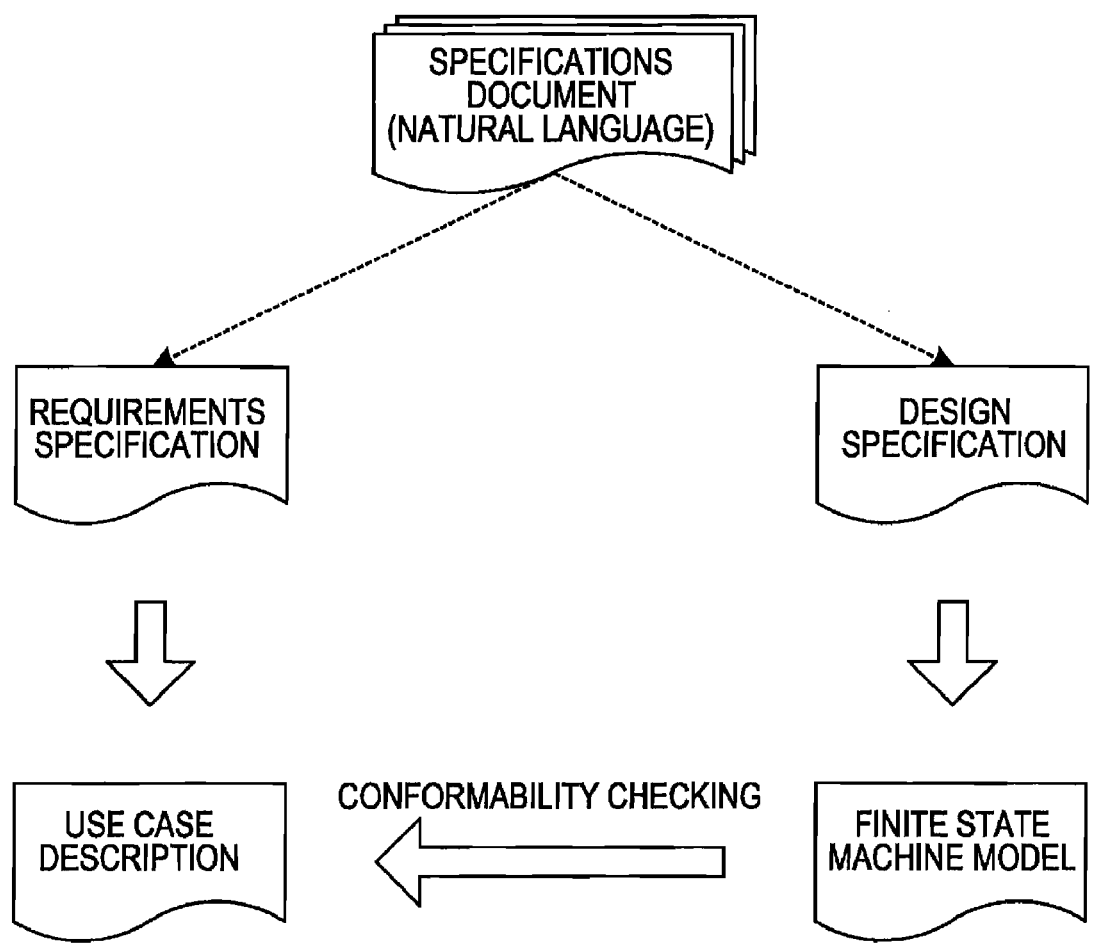
FIG. 1 is an explanatory diagram showing an outline of specification verification in accordance with one embodiment of the present invention.

First, an outline of specification verification according to one embodiment of the present invention will be described hereinbelow. FIG. 1 is an explanatory diagram showing an outline of specification verification in accordance with the embodiment. More specifically, shown therein is an outline in the event of performing the verification of a specification of a design object.

A specifications document defining or describing specifications of a design object, such as software or hardware product, generally, are manually created by use of a natural language. In addition, by analyzing such a specifications document, a requirements specification defining what to produce and a design specification defining how to design is created.

However, depending on the case, since the specifications document described in the natural language has obscurity in nature, the analysis is performed with an insufficient result indicative of inclusion of an omission in a use case (description of a system's behavior which responds to a request from outside of the system) intended to be defined in the requirements specification. This causes an omission(s) also in a test case (case of testing for verifying whether the design object operates in conformity to the specification) that is generated in accordance with the requirements specification. Consequently, a problem occurs in that frequent rectification tasks due to fault verification occur, leading to degradation of the quality of the logic verification.

According to the present embodiment, the requirements specification of the design object is modeled as a requirements specification model (use case description), and the design specification is modeled as a design specification model (finite state machine model). The two models are checked for conformability, thereby to secure the coverage of the requirements specification model with respect to the design specification model. In this manner, creation of the requirements specification without a use case omission (missing use case) present with respect to the design specification is realized, and the quality of the logic verification is improved.

(Hardware Configuration of Specification Verification Apparatus 200)

Figure 2:
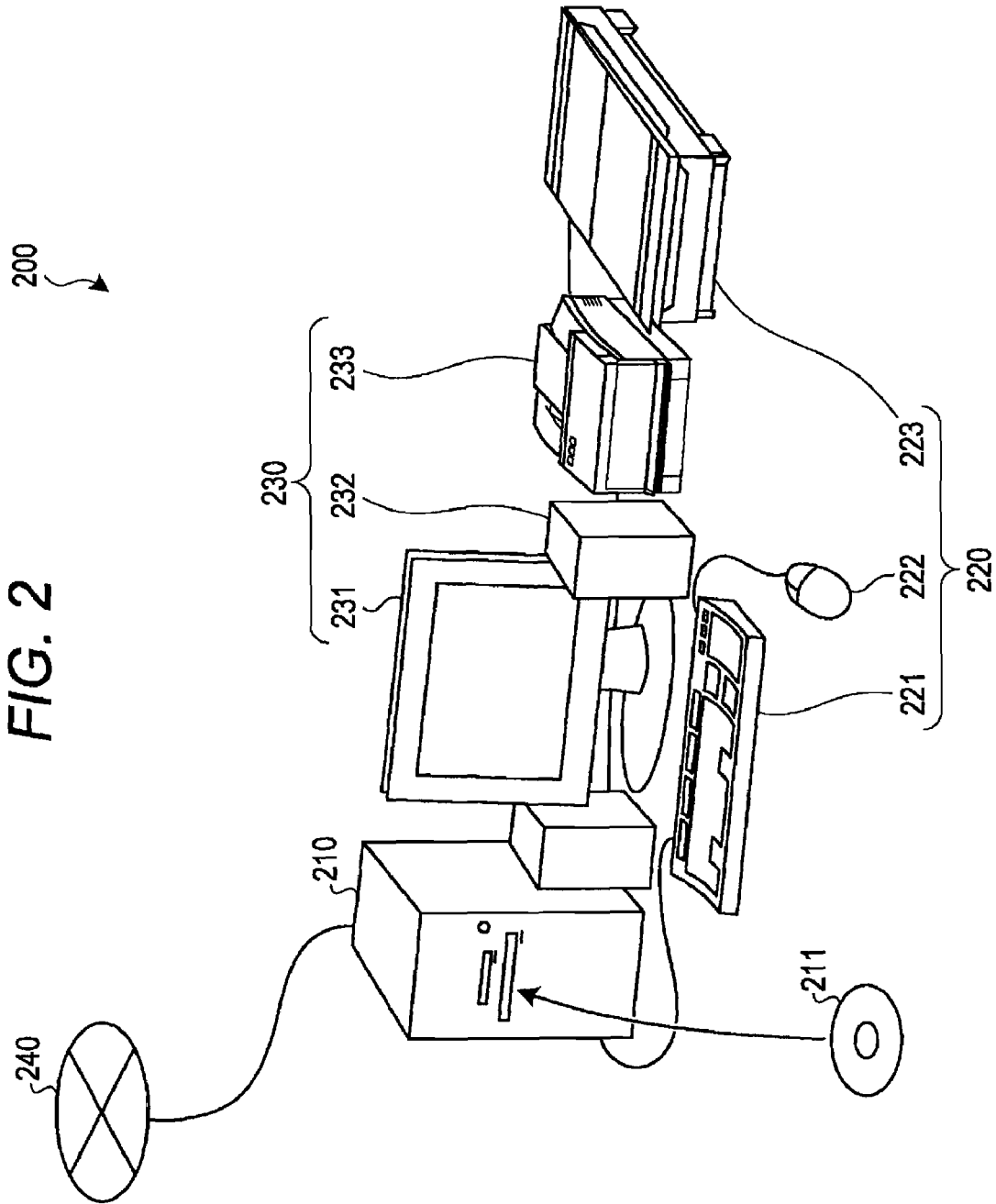
FIG. 2 is an explanatory view showing a hardware configuration of a specification verification apparatus in accordance with one embodiment of the present invention.

A hardware configuration of a specification verification apparatus 200 of the present embodiment will be described hereinbelow. FIG. 2 is an explanatory view showing the hardware configuration of the specification verification apparatus 200 of the present embodiment.

With reference to FIG. 2, the specification verification apparatus 200 is configured to include a computer body 210, input devices 220, and output devices 230. The specification verification apparatus 200 is connectable to a network 240, such as a LAN (local area network), a WAN (wide area network), and the Internet, via, for example, a router (not shown) and a modem (not shown).

The computer body 210 includes a CPU (central processing unit), a memory, and an interface. The CPU operates to control the entirety of the specification verification apparatus 200. The memory includes a ROM (read-only memory), a RAM (random access memory), an HD (hard disk), an optical disk 211, and a flash memory. The memory is used as a work area of the CPU.

The memory further stores therein various programs that are each lorded in response to an instruction issued from the CPU. The HD and the optical disk 211 are, respectively, controlled by disk drives for data read or write being performed thereon. The optical disk 211 and the flash memory is attachable to and detachable from the computer body 210. The interface provides control for inputting from the input devices 220, outputting to the output devices 230, and transmission to and reception from the network 240.

The input devices 220 include a keyboard 221, a mouse 222, and a scanner 223. The keyboard 221 includes keys for the use of entering or inputting characters, numerals, and various instructions, thereby to input data. A touchpanel type may be used for the keyboard 221. The mouse 222 is used for various operations, such as cursor movement, range selection, window movement, and window size changing, for example. The scanner 223 optically reads out images. An image thus read out is retrieved as image data and is store in the memory provided in the computer body 210. The scanner 223 may have an OCR function.

The output devices 230 include a display 231, a speaker 232, and a printer 233. The display 231 displays thereon various things, such as the cursor, icons, and/or toolboxes, and data of textual documents, images, and function information. The speaker 232 outputs audio sounds, such as effect sounds and reading voices. The printer 233 prints data such as image data and textual document data.

(Functional Configuration Specification Verification Apparatus 200)

Figure 3:
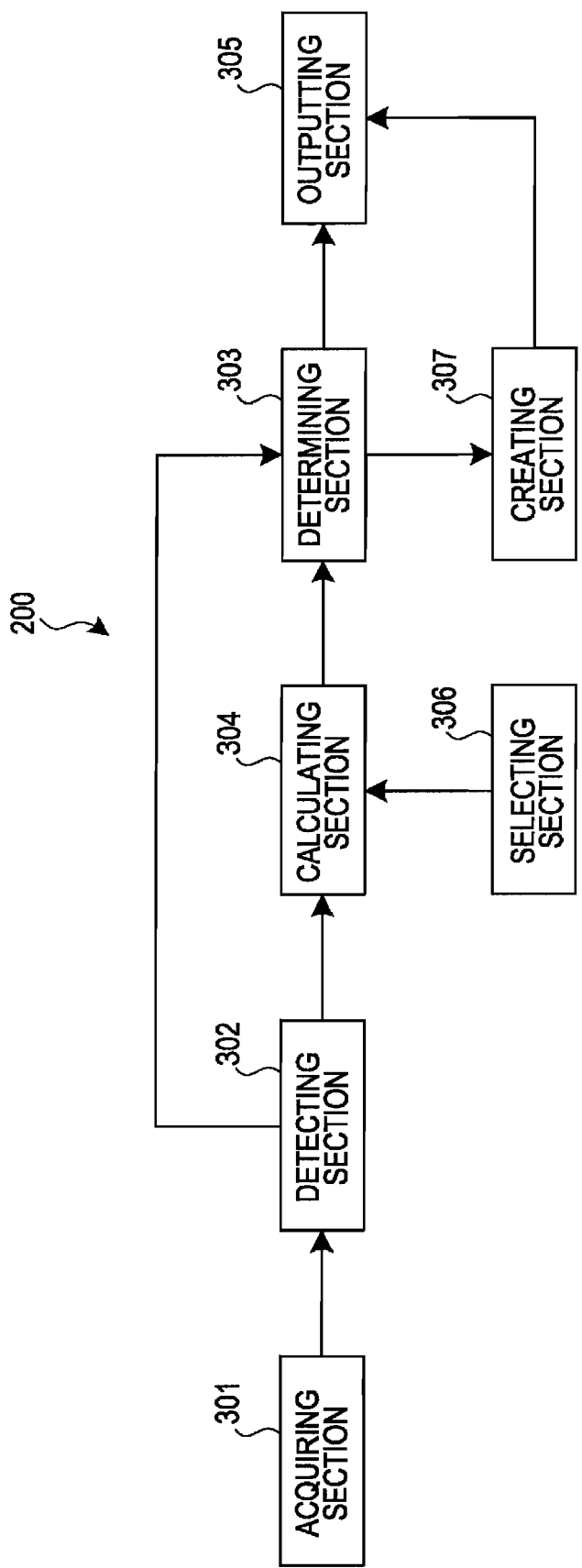
FIG. 3 is a schematic block diagram showing a functional configuration of the specification verification apparatus of the embodiment of the present invention.

FIG. 3 is a schematic block diagram showing a functional configuration of the specification verification apparatus 200 of the embodiment of the invention. With reference to FIG. 3, the specification verification apparatus 200 is configured to include functions, namely, an acquiring section 301, a detecting section 302, a determining section 303, a calculating section 304, an outputting section 305, a selecting section 306, and a creating section 307.

The specification verification apparatus 200 is a computer system that performs verification of the coverage of a requirements specification of a design object, such as a software or hardware product, against a design specification of the design object. The respective functions 301 to 307 of the specification verification apparatus 200 can be implemented in the manner that programs related to the respective functions 301 to 307, which programs are stored in storage areas, are executed by the CPU. Output data from the respective functions 301 to 307 are retained or stored in storage areas. The functional configurations of the connected destination functions shown by arrows in FIG. 3 are, respectively, executed in the manner that the output data of the connected sources are read out from the storage areas, and the programs relative to the functions are executed by the CPU.

The acquiring section 301 has a function that acquires conditions necessary to be satisfied for execution of each use case from a use case description indicative of a requirements specification of a design object. More specifically, the acquiring section 301 acquires an anterior condition necessary to be satisfied before the execution of the use case, a posterior condition necessary to be satisfied after the execution of the use case, and an invariant condition necessary to be satisfied until occurrence of the posterior condition.

A use case description, such as described above, is computer-readable electronic information indicative of a requirements specification of a design object, and is stored in a computer-accessible storage medium. In the use case description, there are described conditions necessary to be satisfied for execution of respective use cases in a use case diagram indicative of functions of a design object. More specifically, an anterior condition, a posterior condition, and an invariant condition are defined in units of the use case.

The anterior condition is a condition necessary to be satisfied (to be true) before the execution of the use case. The posterior condition is a condition necessary to be satisfied after the execution of the use case. The invariant condition is a condition until occurrence of the posterior condition relevant to the use case (during execution).

Figure 4:
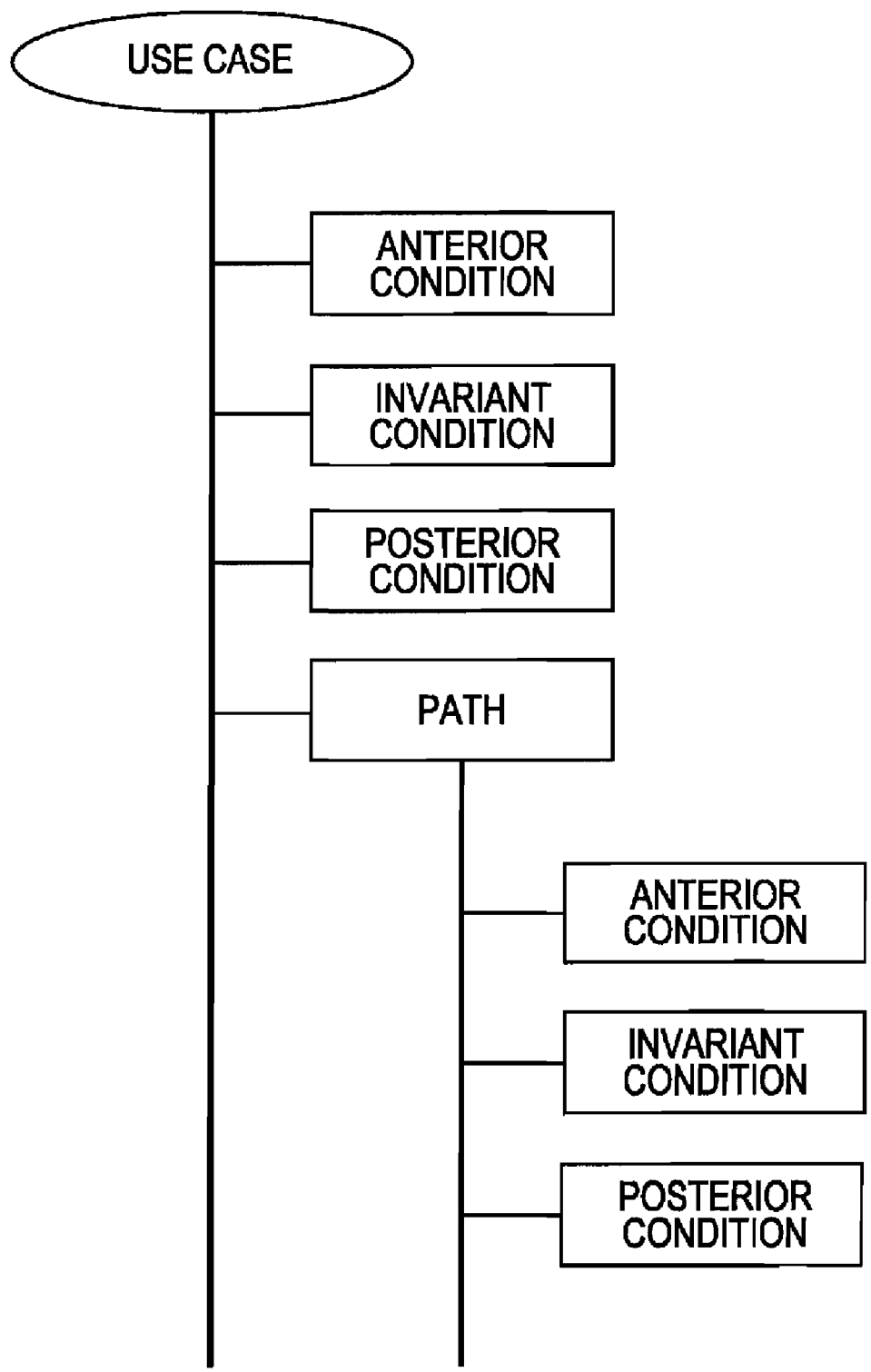
FIG. 4 is an explanatory diagram showing a data structure of a use case description.

A data structure of a use case description will be described hereinbelow. FIG. 4 is an explanatory diagram showing a data structure of a use case description. With reference to FIG. 4, an anterior condition, posterior condition, and invariant condition necessary to be satisfied for execution of the use case are defined in the use case description in units of the use case. Further, there are defined an anterior condition, posterior condition, and invariant condition necessary to be satisfied for execution of a path (scenario) corresponding to the respective use cases.

More specifically, even when a path that is identical in final goal to others but when the path is different in procedure from the others, an anterior condition, posterior condition, and invariant condition necessary to be satisfied for execution of the path are defined. Now, in an example case where a deposit is drawn out using an ATM (automatic teller machine) system of a bank, although the goal (drawing out of the deposit) is identical, a plurality of means (paths) for attaining the goal are present.

For example, a path for drawing out the deposit by use of a cash card and a path for drawing out the deposit by use of a bankbook are present. In this case, in the use case description, there are defined an anterior condition, posterior condition, and invariant condition necessary to be satisfied for execution of the respective paths, i.e., the path for drawing out the deposit by use of the cash card and the path for drawing out the deposit by use of the bankbook.

Now suppose that conditions necessary to be satisfied for path execution are defined in a use case description. In this case, the acquiring section 301 acquires an anterior condition, posterior condition, and invariant condition necessary to be satisfied for execution of each use case and an anterior condition, posterior condition, and invariant condition necessary to be satisfied for execution of a path corresponding to the each use case.

The detecting section 302 has a function of detecting a state of satisfying a condition acquired by the acquiring section 301, from a set of states defined in a finite state machine model indicative of a design specification of a design object. More specifically, the detecting section 302 may detect a state in a state transition path that leads through a state satisfying an anterior condition and concurrently satisfies an invariant condition before the state reaches a state satisfying a posterior condition from an initial state of the finite state machine model.

The finite state machine model is computer-readable electronic information indicative of a design specification of a design object and is stored in a computer-accessible storage medium. More specifically, the finite state machine model is a behavioral (dynamic) model described by use of a set of finite states that a design object can have and a set of finite transitions respectively possible from a certain state to another state. The detection process is executed in units of the use case by use of conditions necessary to be satisfied for execution of each use case acquired by the acquiring section 301.

As an actual practical example, the detection process may be such that a finite state machine model or electronic information is read out, and a description indicative of conditions necessary to be satisfied for the execution of each use case. Alternatively, the detection process may be such that a finite state machine model is actually activated, and the behavior of the finite state machine model is verified, thereby to detect a state satisfying the design conditions.

The functional configuration may be such that the use case description indicative of the requirements specification of the design object and the finite state machine model indicative of the design specification of the design object are directly input into the specification verification apparatus 200. Alternatively, the functional configuration may be such that the use case description and the finite state machine model are acquired from an external computer system via the network 240.

The determining section 303 has a function that determines in accordance with the result of detection performed by the detecting section 302 whether or not an undetected state is present in the set of states represented in the finite state machine model. More specifically, the determining section 303 performs a determination by using the conditions defined in the use case description whether or not all the states represented in the finite state machine model have been detected. More specifically, the determination may be performed to detect the presence or absence of an undetected state in accordance with the result of calculation performed by the calculating section 304.

The calculating section 304 has a function that calculates a percentage rate of the number of states detected by the detecting section 302 to the number of states of the set of states represented in the finite state machine model (the rate hereinbelow will be referred to as "state coverage"). More specifically, the calculating section 304 performs calculation of an index indicative of the degree of coverage with the states detected by the detecting section 302 against the set of finite states that the design object can have.

For example, it is assumed that the number of states of the set of states represented in the finite state machine model is "10". In this case, when the number of states detected by the detecting section 302 is assumed to be "8", the state coverage is calculated as "8/10=4/5→80%". As another example, when the number of states detected by the detecting section 302 is assumed to be "10", the state coverage is calculated as "10/10=1→100%".

The determining section 303 performs a determination of the presence or absence of an undetected state in accordance with the state coverage calculated by the calculating section 304. As an example, the algorithm of the determination may be such that, in the event that the state coverage is less than 100%, it is determined that an undetected state is present; but otherwise, in the event that the state coverage is 100%, it is determined that no undetected state is unpresent.

The calculating section 304 has a function of calculating a percentage rate of the number of transitions detected by the detecting section 302 to the number of transitions of the set of transitions represented in the finite state machine model (the percentage rate hereinbelow will be referred to as "transition coverage"). More specifically, the detecting section 302 calculates an index indicative of the degree of coverage detected by the detecting section 302 to a set of finite transitions respectively possible from a certain state to another state.

For example, it is assumed that the number of transitions of the set of transitions between states represented in the finite state machine model is "10". In this case, when the number of transitions detected by the detecting section 302 is assumed to be "8", the transition coverage is calculated as "8/10=4/5→80%". As another example, when the number of transitions detected by the detecting section 302 is assumed to be "10", the state coverage is calculated as "10/10=1→100%".

The determining section 303 performs a determination of the presence or absence of an undetected state in accordance with the transition coverage calculated by the calculating section 304. As an example, the algorithm of the determination may be such that, in the event that the state coverage is less than 100%, it is determined that an undetected state is present; but otherwise, in the event that the state coverage is 100%, it is determined that no undetected state is unpresent. Further, the coverage references (the state coverage and the transition coverage), which are each used as the determination reference of the determining section 303, may be provided to be arbitrarily selectable.

The selecting section 306 has a function of receiving selection from among the coverage references. More specifically, any one of the "state coverage", "transition coverage", and "state coverage plus transition coverage" can be selected as a coverage reference. In this case, the coverage reference may be selected by a user through the operation of, for example, the keyboard 221 and mouse 222 shown in FIG. 2.

When a coverage reference has been selected by the selecting section 306, the calculating section 304 may calculate the state coverage and/or transition coverage in accordance with the selected coverage reference. In this case, the determining section 303 determines the presence or absence of an undetected state and/or transition in accordance with the coverage reference selected by the selecting section 306.

The calculating section 304 may calculate the state coverage (or transition coverage) in units of the use case. More specifically, in units of the use case, the calculating section 304 may calculate a percentage rate of the number of states (or number of transitions) satisfying the conditions of each use case acquired by the acquiring section 301 to the number of states (or number of transitions) in the state transition path realizing the operation of each use case. Thereby, in units of the use case, the index indicative of the degree of coverage with the states (or transitions) detected by the detecting section 302 can be calculated.

The determining section 303 may determine the presence or absence of an undetected state and/or transition in units of the state transition path realizing the operation of each use case. More specifically, the determining section 303 may determine the presence or absence of an undetected state and/or transition in units of the state transition path satisfying the operation of each use case in accordance with the state coverage and/or transition coverage calculated by the calculating section 304.

The outputting section 305 has a function of outputting a result of the determination performed by the determining section 303. More specifically, the outputting section 305 outputs a result of the determination indicative of an undetected state and/or transition. In this case, the outputting section 305 may output a result of the determination indicative of the presence or absence of an undetected state and/or transition of the operation of each use case in units of the state transition path realizing the operation of each use case.

Figure 9:
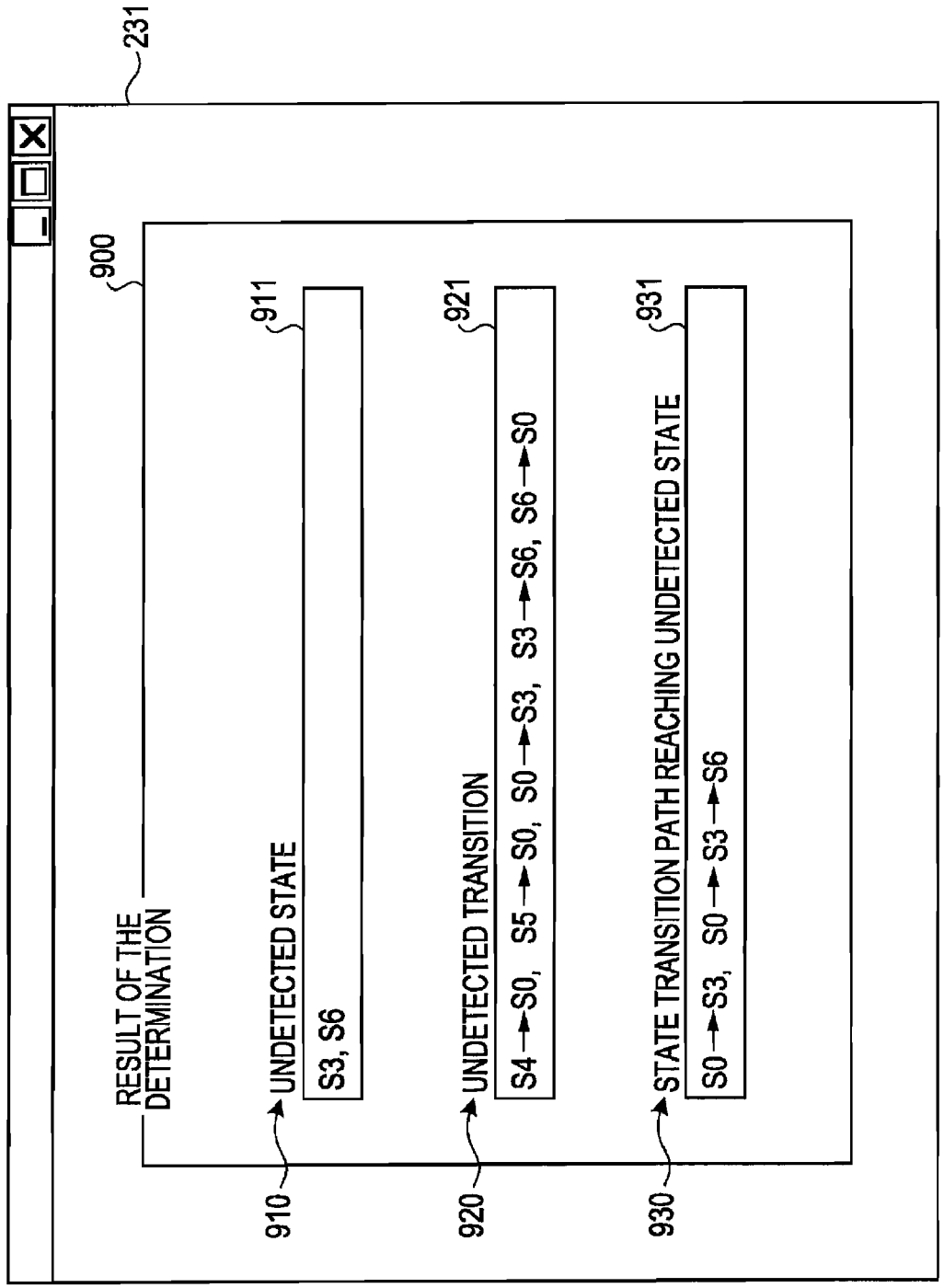
FIG. 9 is an explanatory view showing an example of a screen that is displayed on a display.

The result of the determination may include information designating an undetected state and/or transition (such as message information 910 and 920 shown in FIG. 9, for example). The result of the determination may further include information (such as message information 930 shown in FIG. 9, for example) designating the state transition path leading to an undetected state and/or transition.

The creating section 307 has a function of creating message information designating an undetected state and/or transition. More specifically, the creating section 307 reads out a template preliminarily stored in a storage area of, for example, the ROM or RAM, and embeds a character string designating an undetected state and/or transition into a predetermined position of the template, thereby to create the message information.

The creating section 307 may create message information designating the state transition path reaching an undetected state and/or transition. More specifically, for example, the creating section 307 may operate to read out a template from the storage area and to insert a character string designating a state transition reaching an undetected state and/or transition from the initial state of the finite state machine model into a predetermined position of the template, thereby to create the message information.

The outputting section 305 may output a result of the determination inclusive of the message information created by the creating section 307. A format of the output from the outputting section 305 may be any one of the formats of a screen displayed on the display 231, printout from the printer 233, data output (stored) into a storage area, and data transmitted to an external computer system.

(Actual Practical Examples of Specification Verification)

As an actual practical example of the specification verification of the present embodiment will be described herebelow with reference to an example case of verification of coverage of a requirements specification against a design specification of an arithmetic device. To begin with, a use case diagram and use case description respectively indicative and descriptive of the requirements specification of the arithmetic device will be described.

FIG. 5 is a use case diagram of the arithmetic device, which is denoted by numeral 500 as the design object. Numeral 501 denotes an actor indicative of the CPU that operates to control the entirety of the arithmetic device 500. Numeral 502 denotes a use case indicative of one function "ADD" ("performing the addition") of the arithmetic device 500. Numeral 503 is a use case indicative of one function "SUB" ("performing the subtraction") of the arithmetic device 500.

FIG. 6 is an explanatory view showing a use case description 610 of the arithmetic device 500. With reference to FIG. 6, in the use case description 610, conditions (anterior condition, posterior condition, and invariant condition) for effecting the function of the use case 502 are defined. Further, in the use case description 620, conditions (anterior condition, posterior condition, and invariant condition) for effecting the function of the use case 503 are defined.

Next, a finite state machine model indicative of the design specification of the arithmetic device 500 will be described hereinbelow. The finite state machine model is generated in accordance with, for example, information related to registers of the arithmetic device 500. The information includes, for example, register port information and register operation specification information. The register port information is used to define functions of the registers, and the register operation specification information is used to define operation specifications of the respective registers. The generation is performed in accordance with the well-known scheme, so that detailed descriptions thereof are omitted herefrom.

The finite state machine model can be represented in a graphical form by use of a state transition graph. FIG. 7 is an explanatory view (Part 1) showing a state transition graph 700 of the arithmetic device 500. With reference to FIG. 7, the state transition graph 700 is a graph in which conditions of transition between an arbitrary transition source and a state of transition destinations settable in the design specification of the arithmetic device 500 are correlated to respective transition branches.

Figure 8:
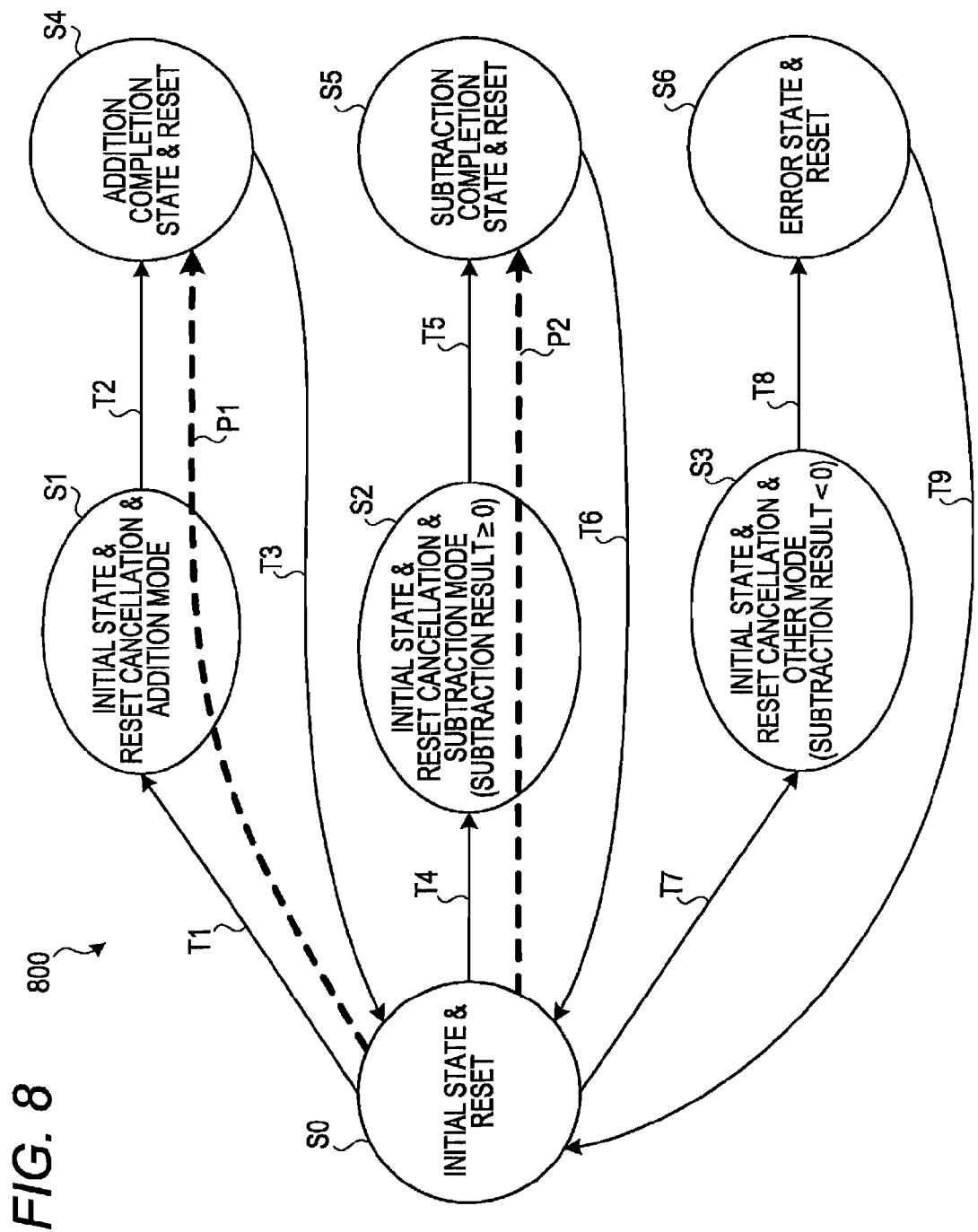
FIG. 8 is an explanatory view (Part 2) showing of the state transition graph of the arithmetic device.

Further, the state transition graph 700 can be segmented and represented by transforming the finite state machine model, into a Kripke model. FIG. 8 is an explanatory view (Part 2) showing of a state transition graph 800 of the arithmetic device 500. With reference to FIG. 8, in the state transition graph 800, there are represented a set of finite states (states SO to S6) settable for the arithmetic device 500 and a set of transitions (transitions T1 to T9) possible from a certain state to another state.

More specifically, in the state transition graph 800, state transitions between states in accordance with operation specifications of the respective registers are represented in a graphical form. For example, when a reset is cancelled and an addition mode (ADD) is set in the state S0 corresponding to the initial state, the state transitions from the state S0 to the state S1 (transition T1). Thereafter, when the addition terminates, the state transitions from the state S1 to the state S4 (transition T2). Then, when the state is reset, the state transitions from the state S4 to the state S0 (transition T3).

A more specific procedure of the specification verification of the arithmetic device 500 will be described hereinbelow with reference to the state transition graph 800. First, in the acquiring section 301, conditions necessary to be satisfied for execution of the use cases 502 and 503 are acquired from the respective use case descriptions 610 and 620. More specifically, an anterior condition, posterior condition, and invariant condition necessary to be satisfied for execution of the use case 502 are acquired from the use case description 610. Similarly, an anterior condition, posterior condition, and invariant condition necessary to be satisfied for execution of the use case 503 are acquired from the use case description 620.

Subsequently, states satisfying the conditions acquired by the acquiring section 301 are detected by the detecting section 302 from the set of states included in the state transition graph 800 indicative of the design specification of the arithmetic device 500. More specifically, an initial state of the state transition graph 800 is specified. The initial state can be designated from an initial value of the respective registers defined in the register port information. Further, states satisfying the respective anterior condition, posterior condition, and invariant condition necessary to be satisfied for the execution of the use case 502 are specified.

In the state transition graph 800, the initial state is the state S0. The state satisfying the anterior condition is the state S1 in which the reset is cancelled and the addition mode is set. The state satisfying the posterior condition is the state S4 in which the addition is terminated (addition completion state). The states satisfying the invariant condition are the states S1 to S3 each maintaining the reset cancellation.

Thereafter, a state transition path P1 that leads through the state S1 satisfying the anterior condition and concurrently satisfies the invariant condition before reaching the state S4 satisfying the posterior condition from the initial state is searched. Then, the states S0, S1, and S4 in the searched state transition path P1 are detected.

Similarly, states satisfying an anterior condition, posterior condition, and invariant condition necessary to be satisfied for execution of the use case 503 are specified. In the state transition graph 800, the state satisfying the anterior condition is the state S2 in which the reset is cancelled and the subtraction mode is set. The state satisfying the posterior condition is the state S5 in which the subtraction is terminated (subtraction completion state). The states satisfying the invariant condition are the states S1 to S3 each maintaining the reset cancellation.

Thereafter, a state transition path P2 that leads through the state S2 satisfying the anterior condition and concurrently satisfies the invariant condition before reaching the state S5 satisfying the posterior condition from the initial state is searched. Then, the states S0, S2, and S5 in the detected state transition path P2 are detected.

Subsequently, a state coverage and/or a transition coverage are calculated by the calculating section 304 in correspondence to the coverage reference selected by the selecting section 306. In the present case, it is assumed that the state coverage and transition coverage are selected as coverage references.

First, in regard to the state coverage, the percentage rate of the number of states in the respective state transition path P1, P2 to the number of states in the set of states (seven states S0 to S6) in the state transition graph 800. More specifically, the number of states in the state transition path P1 is three, namely states S0, S1, and S4, and the number of states in the state transition path P2 is three, namely states S0, S2, and S5.

Then, a union of the number of states (five (states S0, S1, S2, S4, and S5)) in the state transition paths P1 and P2 is calculated, and the percentage rate thereof to the number of states in the set of states in the state transition graph 800 is calculated. As a result, the state coverage is expressed as "5/7→71% (decimals are cut away)". The duplicated states (state S0) in the state transition paths P1 and P2 are handled as one state.

Subsequently, the percentage rate of the number of transitions in the respective state transition path P1, P2 to the number of state-to-state transitions (nine, namely the transition branches T1 to T9) in the set of transitions between states in the state transition graph 800 is calculated. More specifically, the number of transitions in the state transition path P1 is two, namely, the transition branch T1 (S0→S1) and the transition branch T2 (S1→S4), and the number of transitions in the state transition path P2 is two, namely, the transition branch T4 (S0→S2) and the transition branch T5 (S2→S5).

Then, a union of the number of transitions (four, namely the transition branches T1, T2, T4, and T5) in the state transition paths P1 and P2 is calculated, and the percentage rate thereof to the number of state-to-state transitions in the set of transitions between states in the state transition graph 800 is calculated. As a result, the transition coverage is expressed as "4/9→44% (decimals are cut away)".

Subsequently, in the determining section 303, the presence or absence of an undetected state and transition is determined in accordance with the state coverage and transition coverage calculated by the calculating section 304. In the present case, any one of the state coverage and the transition coverage is 100%, it is determined that an undetected state and transition are present. Finally, a result of the determination indicative of the presence of an undetected state and transition is output by the outputting section 305.

In this case, the functional configuration may be such that the result of the determination inclusive of message information created by the creating section 307 is output. The result of the determination to be displayed on the display 231 of the specification verification apparatus 200 will be described hereinbelow. FIG. 9 is an explanatory view showing an example of a screen that is displayed on the display 231. With reference to FIG. 9, on the display 231, there are being displayed message information 910 designating an undetected state, message information 920 designating an undetected transition, and message information 930 designating a state transition path reaching the undetected state.

More specifically, in the message information 910, character strings (S3 and S6) respectively indicative of an undetected states, namely states S3 and S6, are embedded in a predetermined position 911. Further, in the message information 920, character strings (S4→S0, S5→S0, S0→S3, S3→S6, S6→S0), which are respectively indicative of undetected transitions, namely transition T3, T6, T7, T8, and T9, are embedded in a predetermined position 921.

Further, in the message information 930, character strings (S0→S3, and S0→S3→S6), which are respectively indicative of state transition paths (state S0→state S3, and state S0→state S3→state S6) reaching undetected states, namely states S3 and S6, are embedded in a predetermined position 931. In this connection, although not shown, information indicative of values of the respective registers of the undetected states (states S3 and S6) may be output in order to facilitate the designation of the respective states.

Further, message information designating a use case realizing the operation with a state transition path inclusive of an undetected state and/or transition may be output. In the present case, since a state and/or transition in the state transition path realizing the operation of a use case indicative of one function "subtract" of the design object is undetected, so that message information (character string "SUB", for example) designating the use case may be output.

The user is enabled to ascertain the undetected state and transition by confirming the result of the determination. The user is further enabled to detect a use case (or path) not defined in the use case description by analyzing the contents of the message information 910, 920, and 930.

More specifically, it can be known that a use case indicative of a "reset" function, which is one function of the arithmetic device 500, is omitted from the undetected transitions T3, T6, and T9. It can be further known that a path related to the operation of an abnormal sequence of the use case 503 is omitted from the state transition path reaching undetected states, namely the states S3 and S6.

Figure 10:
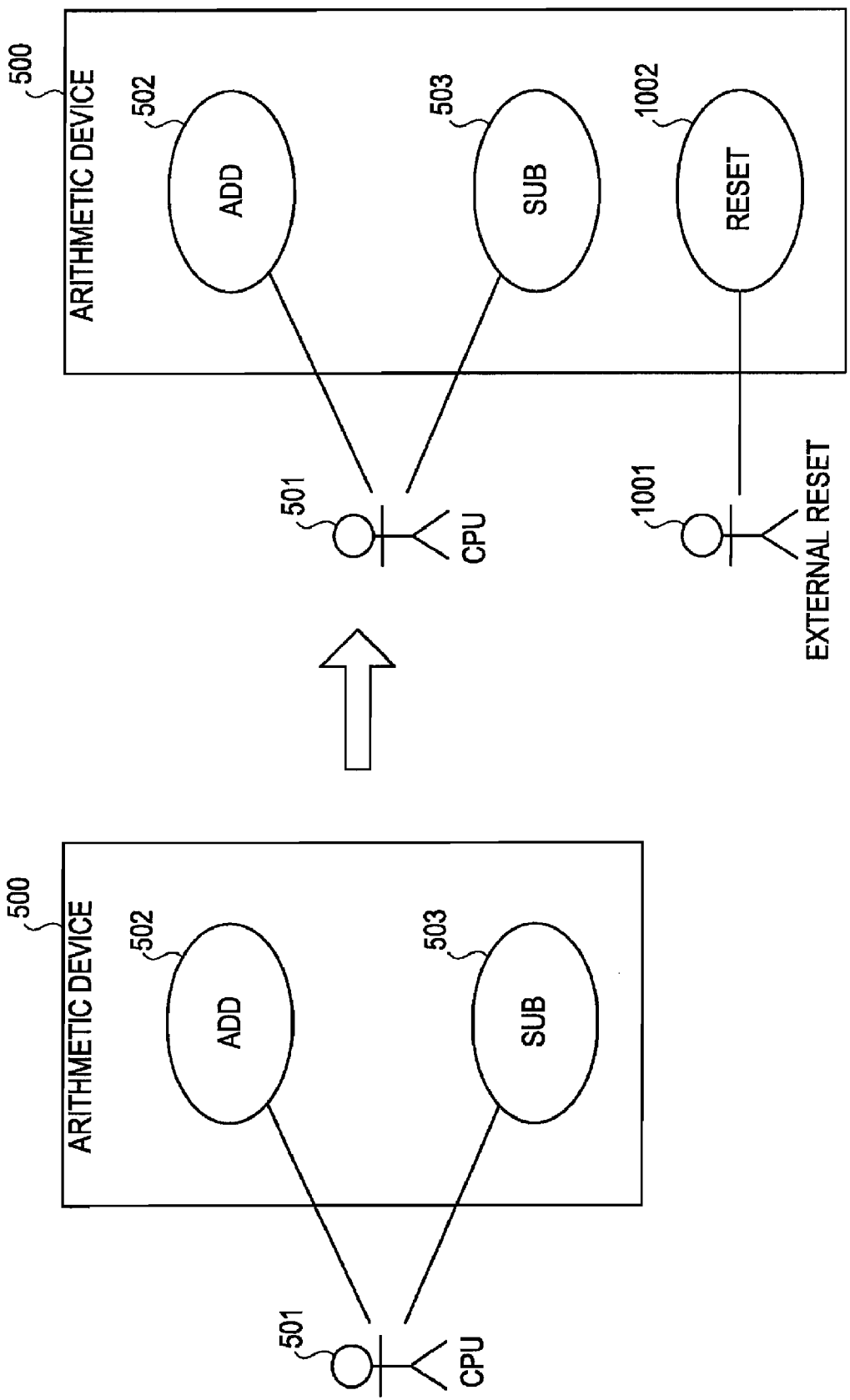
FIG. 10 is an explanatory view (Part 1) showing addition of a use case.
Figure 11:
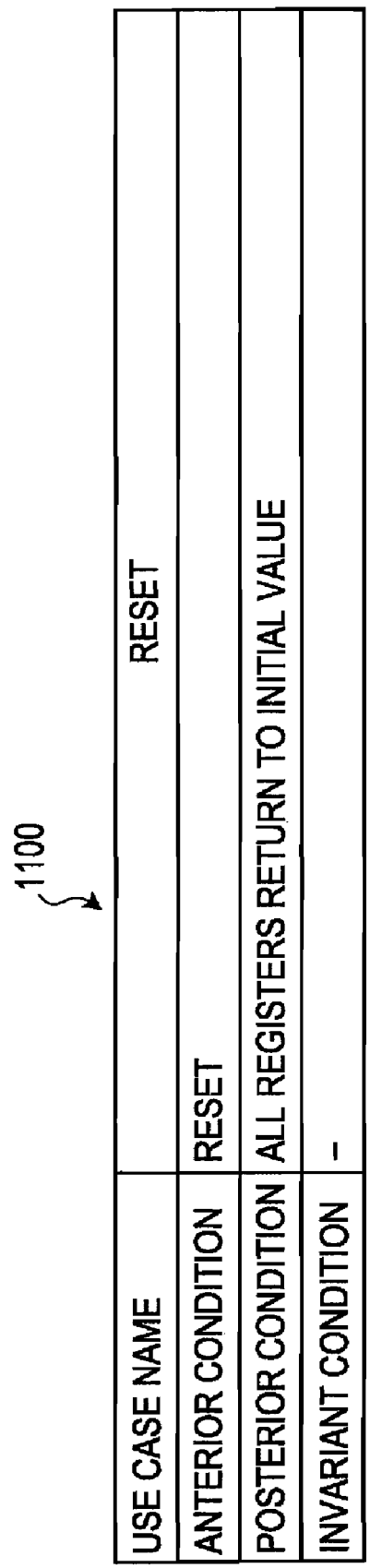
FIG. 11 is an explanatory view (Part 2) showing addition of the use case.

In a stage before implementation, the use case diagram shown in FIG. 5 and the use case description 620 shown in FIG. 6 can be modified in accordance with the result of the determination described above. FIGS. 10 and 11 are explanatory views showing the addition of a use case. With reference to FIG. 10, an actor 1001 indicative of an external reset and a use case 1002 indicative of the "reset" function, which is one function of the arithmetic device 500, are added into the use case diagram of the arithmetic device 500.

Further, with reference to FIG. 11, correspondingly to the addition of the use case 1002, a use case description 1100 for defining conditions (anterior condition, posterior condition, and invariant condition) necessary to cause the use case 1002 to function is added. More specifically, a condition for causing functioning of a use case in which, when the reset is effected, all registers return to the initial value.

Figure 12:
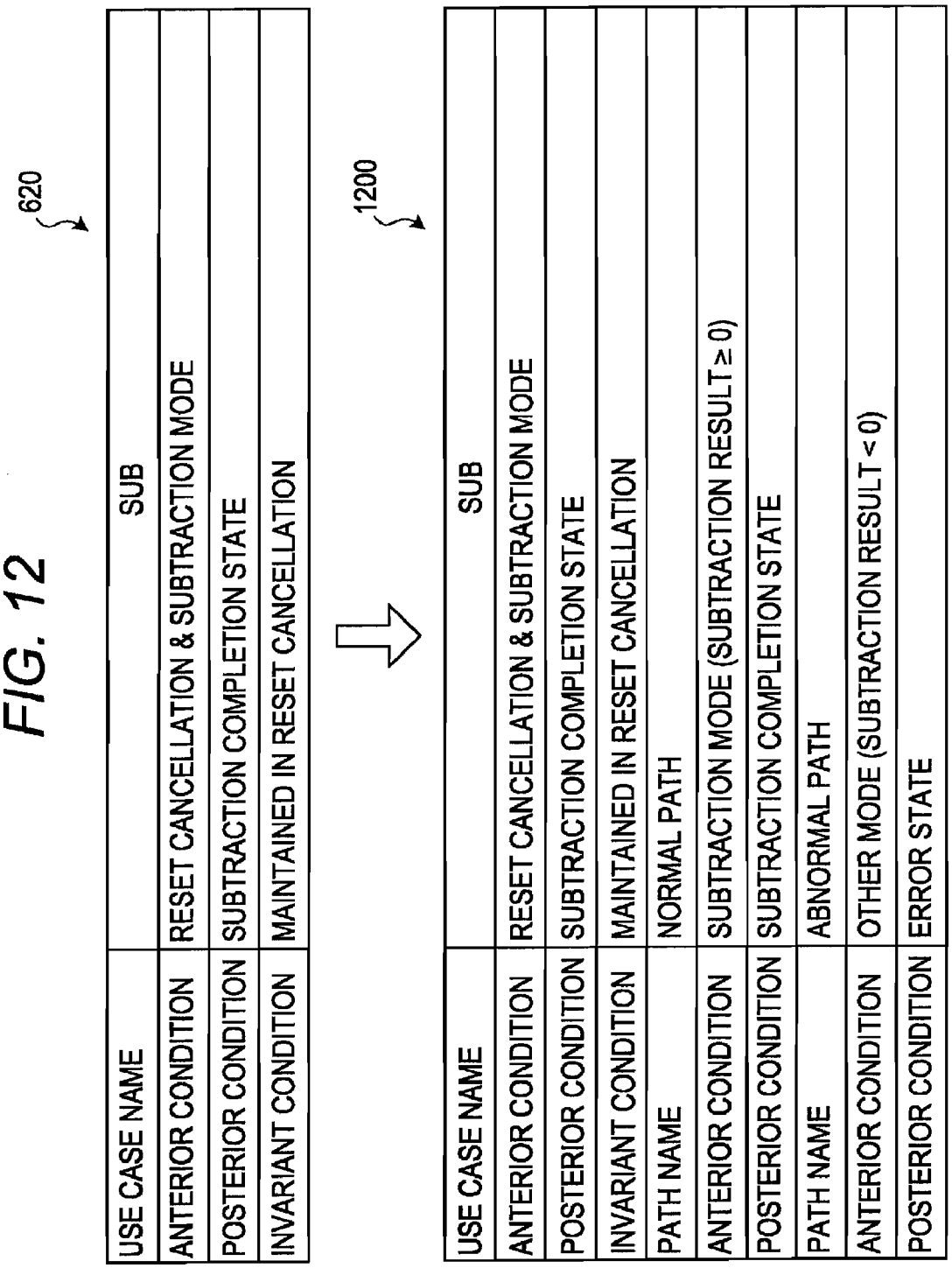
FIG. 12 is an explanatory view showing addition of paths.

FIG. 12 is an explanatory view showing addition of path. With reference to FIG. 12, conditions necessary to cause functioning of a path of a normal sequence and a path of an abnormal sequence are added into the use case description 620 indicative of one function "subtract" of the arithmetic device 500. More specifically, in a use case description 1200, there are defined a condition for causing functioning a normal path and a condition for causing functioning an abnormal path. The normal path transitions to a subtraction completion state when the subtraction mode is set (subtraction result≦0), and the abnormal path transitions to an error state when another mode is set (subtraction result<0).

As described above, rectification in the verification work due to a test case omission can be prevented by securing conformability of the requirements specification against the design specifications in the stage before implementation, so that the quality of the logic verification can be improved.

(Procedure of Specification Verification Process by Specification Verification Apparatus 200)

Figure 13:
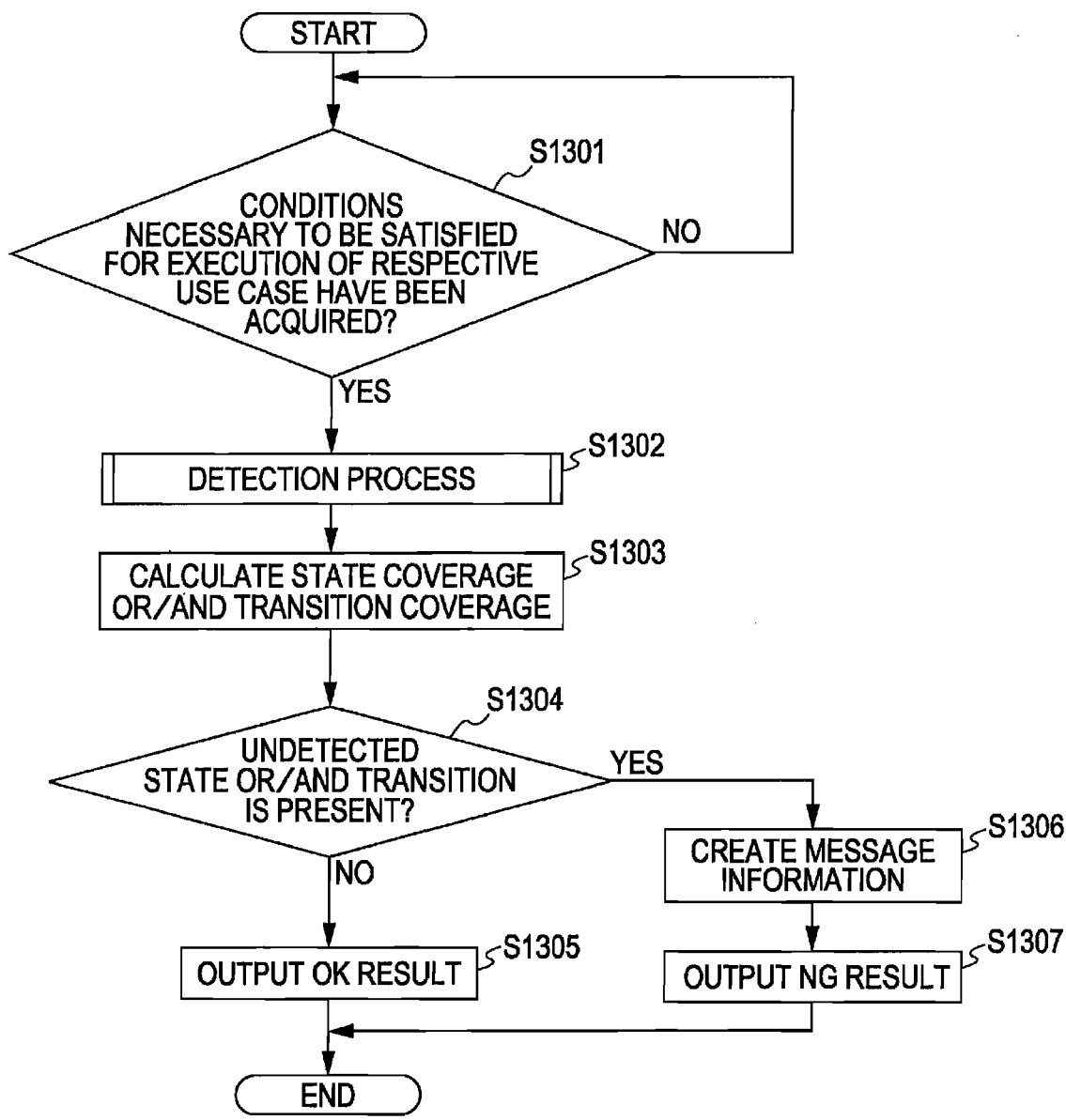
FIG. 13 is a flow chart showing a procedure of a specification verification process by the specification verification apparatus of the embodiment.

FIG. 13 is a flow chart showing a procedure of the specification verification process being performed by the specification verification apparatus 200 of the embodiment. In the flow chart of FIG. 13, it is first determined whether or not conditions necessary to be satisfied for execution of each use case have been acquired by the acquiring section 301 from a use case description indicative of a requirements specification of a design object (S1301).

While acquisition of respective conditions is being awaited (S1301: No), if the conditions have been acquired (S1301: Yes), a detection process is executed by the detecting section 302 to detect a state satisfying the conditions, which have been acquired by the acquiring section 301, from a set of states represented in a finite state machine model indicative of a design specification of the design object (S1302). Then, the state coverage and/or transition coverage are calculated by the calculating section 304 (S1303).

Subsequently, it is determined by the determining section 303 whether an undetected state and/or transition is present or unpresent in accordance with the state coverage and/or transition coverage calculated by the calculating section 304 (S1304). If an undetected state and/or transition is not present (S1304: No), then an OK result indicative of the absence of an undetected state and/or transition is output by the outputting section 305 (S1305). Then, the series of processes according to the flow chart ends.

On the other hand, if at S1304 an undetected state and/or transition is present (S1304: Yes), message information specifying the undetected state and/or transition is created by the creating section 307 (S1306). Then, finally, an NG result inclusive of the message information created by the creating section 307 is output by the outputting section 305 (S1307), and the series of processes according to the flow chart ends.

Figure 14:
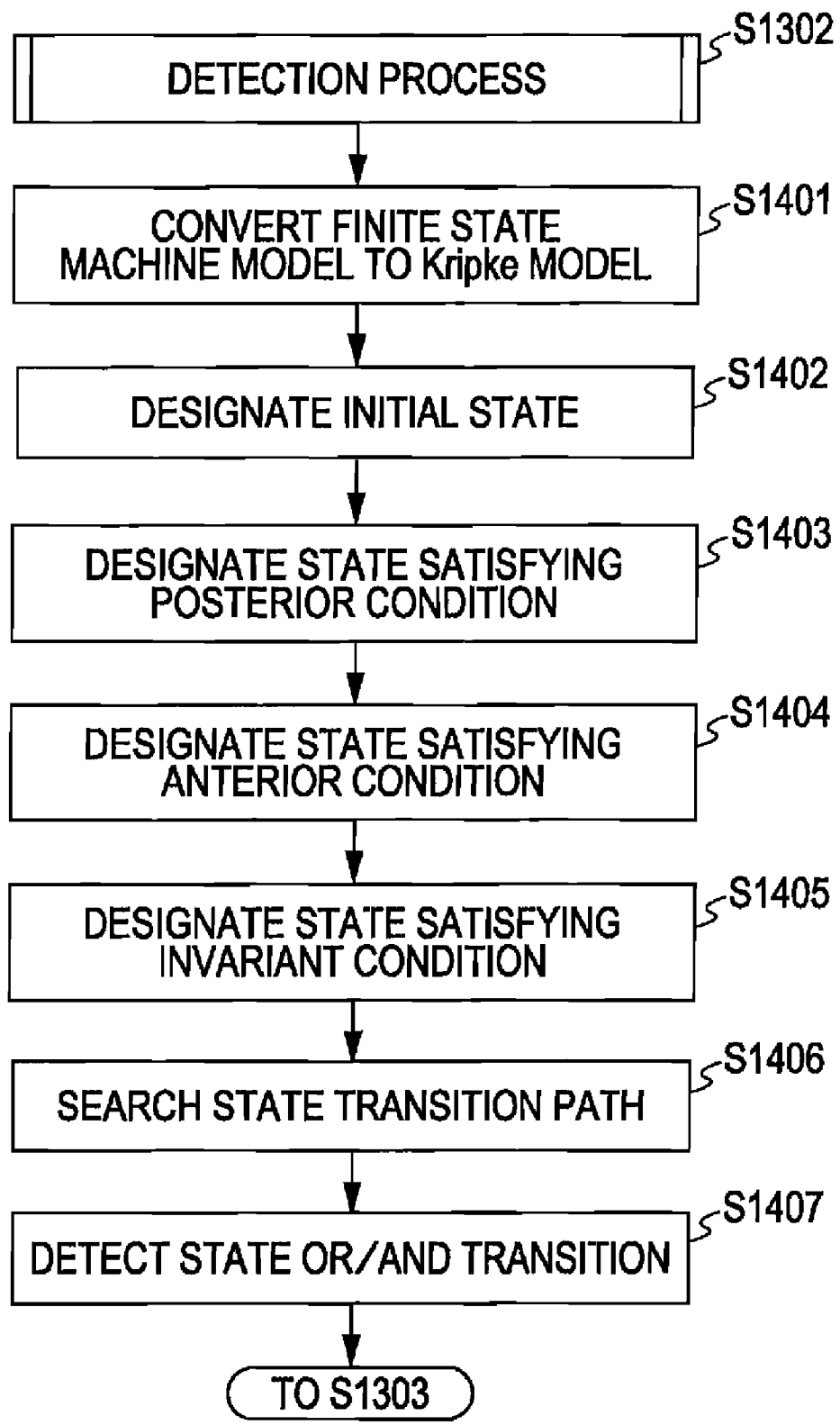
FIG. 14 is a flow chart showing a processing procedure of a detection process at S1302.

Next, a processing procedure of the detection process at S1302 shown in FIG. 13 will be described hereinbelow. FIG. 14 is a flow chart showing the processing procedure of the detection process at S1302. With reference to the flow chart of FIG. 14, the finite state machine model, which is indicative of the design specification of the design object, is converted to a Kripke model (S1401).

Then, an initial state of the Kripke model is designated by referencing values of respective registers (S1402). Further, by use of the anterior condition, posterior condition, and invariant condition acquired by the acquiring section 301, a state satisfying the posterior condition is designated (S1403), a state satisfying the anterior condition is designated (S1404), and a state satisfying the invariant condition is designated (S1405).

Subsequently, with the use of the states designated at respective steps S1402 to S1405, a state transition path that leads through the state satisfying the anterior condition and concurrently satisfies the invariant condition before reaching the state satisfying the posterior condition from the initial state (S1406) is searched. Then, a state and/or transition in the state transition path is detected (S1407), and then the procedure moves to S1303 shown in FIG. 13.

As described above, according the present embodiment, the coverage of the set of states defined in the use case description of the design object can be verified against the set of states represented in the finite state machine model of the design object, and the result of the verification can be output. Consequently, by referencing the output result, the user is able to easily confirm the conformability between the design specification and the requirements specification in the stage before implementation. Further, the coverage of the set of transitions defined in the use case description can be verified against the set of transitions represented in the finite state machine model, and the result of the verification can be output. Consequently, by referencing the output result, the user is able to easily confirm the conformability between the design specification and the requirements specification in the stage before implementation.

More specifically, by the use of the anterior condition, posterior condition, and invariant condition necessary to be satisfied for execution of the use case (or path), the specification verification apparatus 200 of the present embodiment searches the state transition path realizing the operation of the use case defined in the use case description, thereby being able to detect the state and/or transition in the state transition path.

In addition, by use of the state coverage indicative of the degree of the coverage of the detected state, the specification verification apparatus 200 is able to determine the presence or absence of an undetected state against the infinite set of states settable for the design object. Further, by use of the transition coverage indicative of the degree of the coverage of the detected transition, the specification verification apparatus 200 is able to determine the presence or absence of an undetected transition against the infinite set of transitions possible from a certain state to another state.

By referencing the output result of the above-described process performed by the specification verification apparatus 200, the user is enabled to easily detect an undefined use case (or path) in the stage before implementation. Further, in accordance with the message information included in the result of the determination, an undetected state and/or transition can easily be designated, and a state transition path reaching the undetected state and/or transition can easily be designated.

As such, in the stage before implementation, the user is able to make correction in such a manner that, for example, an undefined use case is defined by being added into the use case description. As a consequence, the amount of the rectification work in the verification process due to test case omissions can be reduced, and hence the quality improvement of the logic verification and the reduction in the verification process period of time can be accomplished.

As described above, according to the computer-readable recording medium storing therein the specification verification program, the specification verification apparatus, and the specification verification method, the efficient and comprehensive logic verification is realized in the manner that the conformability of the requirements specification to a design specification is checked in the stage before implementation. Thereby, the reduction in operational burden on a designer and the reduction in design period of time can be accomplished.

The specification verification method described in the present embodiment can be realized in the manner that the preliminarily provided program is executed in a computer such as a personal computer or workstation. The program is stored in a computer-readable recording medium, such as a hard disk, flexible disk, CD-ROM (compact disk-read only memory), MO (magneto optical) disk, or DVD (digital versatile disk), and is executed by being read out by the computer from the recording medium. Alternatively, the program may be provided in a transmission medium distributable via a network such as the Internet.

Further, the specification verification apparatus 200, which has been described in the present embodiment, can be implemented by, for example, a standard cell or structured ASIC (application specific integrated circuit) (which hereinbelow will be referred to as "ASIC"), or a PLD (programmable logic device) such as an FPGA (field modified programmable gate array). More specifically, the specification verification apparatus 200 can be manufactured in the manner that, for example, the functional configuration sections 301 to 307 of the specification verification apparatus 200 are functionally defined in HDL (hardware definition language) descriptions, and the HDL descriptions are logically synthesized and imparted to, for example, the ASIC or PLD.

Therefore, embodiments of the invention can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. An example of transmission communication media includes a carrier-wave signal.

Further, according to an aspect of the embodiments of the invention, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable medium storing a specification verification program that causes a computer to perform a specification verification of coverage of a requirements specification of a design object against a design specification of the design object, according to operations comprising:

acquiring from a use case description as the requirements specification of the design object, one or more anterior, posterior or invariant conditions necessary to be satisfied in connection with execution of each use case;

detecting a state from a set of states in a finite state machine model as the design specification of the design object that satisfies one or more of the conditions acquired from the use case description;

determining presence or absence of an undetected state in the set of states in accordance with a result of the detection performed in the detecting; and outputting a result of the determining.

2. A non-transitory computer-readable medium storing a specification verification program, according to claim 1, wherein
the detecting detects a transition satisfying the conditions acquired, from among a set of transitions between transitions represented in the finite state machine model; and
the determining determines the presence or absence of an undetected transition in the set of transitions in accordance with the result of the detection performed in the detecting.

3. A non-transitory computer-readable medium storing a specification verification program, according to claim 1, wherein the anterior condition is necessary to be satisfied before execution of the use case, the posterior condition is necessary to be satisfied after the execution of the use case, and the invariant condition required for the use case before occurrence of the posterior condition; and
the detecting detects a state in a state transition path that leads through a state satisfying the anterior condition and concurrently satisfies the invariant condition before reaching a state satisfying the posterior condition from an initial state of the finite state machine model.

4. A non-transitory computer-readable medium storing a specification verification program, according to claim 3, wherein the detecting detects a transition between states in the state transition path.

5. A non-transitory computer-readable medium storing a specification verification program, according to claim 1, the operations further comprising calculating as a state coverage a percentage rate of a number of states detected in the detecting to a number of states in the set of states represented in the finite state machine model, wherein
the determining determines the presence or absence of the undetected state in accordance with the state coverage calculated in the calculating.

6. A non-transitory computer-readable medium storing a specification verification program, according to claim 5, wherein the calculating calculates as a transition coverage a percentage rate of a number of transitions detected in the detecting to a number of transitions in the set of transitions represented in the finite state machine model, wherein
the determining determines the presence or absence of the undetected transition in accordance with the transition coverage calculated in the calculating.

7. A non-transitory computer-readable medium storing a specification verification program, according to claim 1, wherein the result of the determination indicates any one of the presence or absence of the undetected state and/or transition, message information designating the undetected state and/or transition, message information designating an undetected transition, and message information designating a state transition path reaching the undetected state and/or transition from an initial state of the finite state machine model.

8. A specification verification apparatus that performs a specification verification of coverage of a requirements specification of a design object against a design specification of the design object, the specification verification apparatus comprising:
acquiring unit to acquire from a use case description as the requirements specification of the design object, one or more anterior, posterior or invariant conditions necessary to be satisfied in connection with conditions necessary to be satisfied in connection with execution of each use case from a use case;
detecting unit to detect a state from among a set of states in a finite state machine model as the design specification of the design object that satisfies one or more of the conditions acquired from the use case description;
determining unit to determine presence or absence of an undetected state in the set of states in accordance with a result of the detection performed in the detecting unit; and
output unit to output a result of the determination performed in the determining unit.

9. A specification verification apparatus according to claim 8, wherein
the detecting unit performs a detection of a transition satisfying the conditions acquired in the acquiring unit, from among a set of transitions between states represented in the finite state machine model; and
the determining unit performs a determination of the presence or absence of an undetected transition in the set of transitions in accordance with the result of the detection performed in the detecting unit.

10. A specification verification apparatus according to claim 8, wherein
the anterior condition is necessary to be satisfied before execution of the use case, the posterior condition is necessary to be satisfied after the execution of the use case, and the invariant condition is required for the use case before occurrence of the posterior condition; and
the detecting unit performs a detection of a state in a state transition path that leads through a state satisfying the anterior condition and concurrently satisfies the invariant condition before reaching a state satisfying the posterior condition from an initial state of the finite state machine model.

11. A specification verification apparatus according to claim 10, wherein the detecting unit performs a detection of a transition between states in the state transition path.

12. A specification verification apparatus according to claim 8, further comprising a calculating unit calculating as a state coverage a percentage rate of a number of states detected in the detecting unit to a number of states in the set of states represented in the finite state machine model, wherein
the determining unit performs the determination of the presence or absence of the undetected state in accordance with the state coverage calculated in the calculating unit.

13. A specification verification apparatus according to claim 12, wherein the calculating unit calculates as a transition coverage a percentage rate of a number of transitions detected in the detecting unit to a number of transitions in the set of transitions represented in the finite state machine model, wherein
the determining unit performs the determination of the presence or absence of the undetected transition in accordance with the transition coverage calculated in the calculating unit.

14. A specification verification apparatus according to claim 8, wherein the result of the determination indicates any one of the presence or absence of the undetected state and/or transition, message information designating the undetected state and/or transition, message information designating an undetected transition, and message information designating a state transition path reaching the undetected state and/or transition from an initial state of the finite state machine model.

15. A specification verification method to perform a specification verification of coverage of a requirements specification of a design object against a design specification of the design object, the specification verification method comprising:

acquiring from a use case description as the requirements specification of the design object, one or more anterior, posterior or invariant conditions necessary to be satisfied in connection with execution of each use case;

detecting a state from among a set of states in a finite state machine model as the design specification of the design object that satisfies one or more of the conditions acquired from the use case description;

determining presence or absence of an undetected state in the set of states in accordance with a result of the detection performed in the detecting, using a computer; and outputting a result of the determination performed in the determining.

16. A specification verification method according to claim 15, wherein the detecting detects a transition satisfying the conditions acquired in the acquiring, from among a set of transitions between states represented in the finite state machine model; and the determining determines the presence or absence of an undetected transition in the set of transitions in accordance with the result of the detection performed in the detecting.

17. A specification verification method according to claim 15, wherein the anterior condition is necessary to be satisfied before execution of the use case, the posterior condition is necessary to be satisfied after the execution of the use case, and the invariant condition is required for the use case before occurrence of the posterior condition; and the detecting detects a state in a state transition path that leads through a state satisfying the anterior condition and concurrently satisfies the invariant condition before reaching a state satisfying the posterior condition from an initial state of the finite state machine model.

18. A specification verification method according to claim 15, further comprising calculating as a state coverage a percentage rate of a number of states detected in the detecting to a number of states in the set of states represented in the finite state machine model, wherein the determining determines the presence or absence of the undetected state in accordance with the state coverage calculated in the calculating.

19. A specification verification method according to claim 18, wherein the calculating calculates as a transition coverage a percentage rate of a number of transitions detected in the detecting to a number of transitions in the set of transitions represented in the finite state machine model, wherein the determining determines the presence or absence of the undetected transition in accordance with the transition coverage calculated in the calculating.

20. A method of verifying coverage of a requirements specification of a design object against a design specification of the design object, the method comprising:

acquiring a use case description as the requirements specification of the design object, acquiring one or more anterior, posterior or invariant conditions necessary to be satisfied in connection with execution of each use case;

detecting a state from among a set of states in a finite state machine as the design specification of the design object that satisfies one or more of the conditions acquired from the use case description, using a computer; and determining presence or absence of an undetected state in the set of states, according to the detecting.

* * * * *

UNITED STATES PATENT AND TRADEMARK OFFICE
CERTIFICATE OF CORRECTION

PATENT NO. : 8,079,001 B2
APPLICATION NO. : 12/136378
DATED : December 13, 2011
INVENTOR(S) : Qiang Zhu et al.

It is certified that error appears in the above-identified patent and that said Letters Patent is hereby corrected as shown below:

Title Page, Item (54) (Title), Line 4, after "MEDIUM" insert -- , --.

Column 1, Line 4, after "MEDIUM" insert -- , --.

Signed and Sealed this
Twenty-seventh Day of March, 2012

David J. Kappos
*Director of the United States Patent and Trademark Office*